(12) United States Patent
Millington

(10) Patent No.: US 6,363,322 B1
(45) Date of Patent: *Mar. 26, 2002

(54) NAVIGATION SYSTEM WITH UNIQUE AUDIO TONES FOR MANEUVER NOTIFICATION

(75) Inventor: Jeffrey Alan Millington, Rochester Hills, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/470,441

(22) Filed: Dec. 22, 1999

(51) Int. Cl.[7] .............................................. G01C 21/00
(52) U.S. Cl. .................. 701/211; 701/212; 342/357.13
(58) Field of Search ................................. 701/211, 200, 701/212; 340/988, 990, 995, 996; 342/357.13

(56) References Cited

U.S. PATENT DOCUMENTS

| | | | |
|---|---|---|---|
| 4,242,731 A | 12/1980 | Mizote et al. ............... 364/436 |
| 4,679,147 A | 7/1987 | Tsuji et al. .................. 364/449 |
| 4,937,751 A | 6/1990 | Nimura et al. ............... 364/449 |
| 5,177,685 A | 1/1993 | Davis et al. ................. 364/443 |
| 5,394,332 A | 2/1995 | Kuwahara et al. ........... 364/449 |
| 5,406,492 A | 4/1995 | Suzuki ........................ 364/449 |
| 5,495,416 A | 2/1996 | Buchwitz et al. ............ 364/449 |
| 5,592,389 A | 1/1997 | La Rue et al. ............. 364/449.5 |
| 5,935,193 A | 8/1999 | Saiki ........................... 701/211 |
| 5,951,621 A * | 9/1999 | Palalau et al. .............. 701/200 |
| 6,172,641 B1 * | 1/2001 | Millington ............. 342/357.13 |

FOREIGN PATENT DOCUMENTS

DE 9728470 1/1999

* cited by examiner

*Primary Examiner*—Yonel Beaulieu
(74) *Attorney, Agent, or Firm*—Carlson, Gaskey & Olds, P.C.

(57) ABSTRACT

A vehicle navigation system provides non-voice audible maneuver instructions to a driver immediately prior to an upcoming maneuver. When the vehicle is very near the execution of the upcoming maneuver, it is preferable to provide a non-voice audible maneuver instruction that is always consistent with the upcoming maneuver. After a short familiarization period the driver will intuitively identify a particular tone or series of tones with a particular maneuver. Further, by only providing the non-voice audio maneuver instruction within a relatively short distance prior to the upcoming maneuver the driver will identify the tone(s) with the immediacy of the upcoming maneuver.

29 Claims, 3 Drawing Sheets

NAVIGATION SYSTEM WITH UNIQUE AUDIO TONES FOR MANEUVER NOTIFICATION

BACKGROUND OF THE INVENTION

This invention generally relates to navigation or route guidance systems and, more particularly, to a navigation system that provides a predefined non-voice audio maneuver instruction to notify the navigation system user of an upcoming maneuver.

Navigation systems generally provide a recommended route from a starting point to a desired destination. Generally, the starting point and desired destination are selected from a large database of roads stored in a mass media storage, such as a CD ROM, which includes the roads in the area to be traveled by the user. If the navigation system is installed in a vehicle, the starting point is typically the current position of the vehicle, which can be input to the navigation system by an associated position determining system that usually includes a GPS (Global Positioning System) receiver.

The navigation system determines a route from the starting point to the destination utilizing an algorithm well-known to those in the art and currently in use in many navigation systems. Usually there are many potential routes between the selected starting point and the desired destination. Typical navigation systems select a recommended route based upon certain "cost" values associated with each segment of road in the road database. These cost values include the length of the road segment and the estimated time of travel through the road segment. The navigation system selects the potential route with the lowest total cost to be the recommended route. Depending upon the predetermined algorithm of the navigation system, the navigation system will recommend the route with the shortest total length, the lowest total time, or some weighted average of length and time.

The recommended route is then displayed to the user as a map showing the starting point and desired destination and highlighting the recommended route. Preferably, if the navigation system is installed in a vehicle, the navigation system displays the current position of the vehicle and provides visual turn-by-turn instructions to the driver, guiding the driver to the selected destination.

Many navigation systems also provide audible turn-by-turn instructions to the diver. To give the driver time to refer to the system display, the turn-by-turn instruction is typically provided a fraction of a mile away from the actual desired maneuver. The driver may therefore have trouble identifying a particular maneuver with the surroundings. This is particularly troubling in a highly congested and road intense environment such as a city. Another disadvantage of such a system is that drivers do not always correlate a single tone or voice command with an upcoming maneuver. The drivers must therefore look at the navigation system to assure themselves of what maneuver they are to perform. This necessarily decreases the intuitive value of the navigation system and thus decreases the benefit of providing audio information.

It is thus desirable to provide a system for projecting definite non-voice audio maneuver instructions that enhances the ability of a driver to correctly perceive the content of the instruction without refelting to a visual display.

SUMMARY OF THE INVENTION

In general terms, this invention provides a vehicle navigation system in combination with a vehicle audio system that provides non-voice audible maneuver instructions to a driver immediately prior to an upcoming maneuver.

The navigation system generally includes a database of a plurality of roads, a position determining system, an input device, and a route determination system. The position determining system determines a position of the vehicle relative to the plurality of roads. The user selects a destination from the database with the input device. The navigation system then calculates and displays a recommended route directing the driver of the vehicle to the desired destination. Preferably, the navigation system displays turn-by-turn instructions on a display and gives corresponding audible instructions on an audio speaker to guide the driver to the desired destination.

As the vehicle approaches an upcoming maneuver the display switches from a large-scale map display screen to a maneuver instruction screen. The maneuver instruction indicates to the driver the next maneuver to be performed along the recommended route to the destination, such as a turn arrow. The maneuver instruction screen also displays a countdown display such as a bar graph which indicates the imminence of the upcoming maneuver. The user is thereby provided with constant information on the upcoming maneuver and the distance to the upcoming maneuver. This is particularly advantageous in a highly congested or road intense environment such as a city.

When the vehicle is very near the execution of the upcoming maneuver, it is preferable to provide a non-voice audible maneuver instruction that is always consistent with the upcoming maneuver. For example only: a right turn can be a low tone followed by a high tone; a left turn can be a high tone followed by a low tone; a straight ahead instruction can be a mid-level tone followed by another mid-level tone; and a U-turn can be a a high tone followed by a low tone followed by a high tone. After a short familiarization period the driver will intuitively identify a particular tone or series of tones with a particular maneuver. Further, by only providing the non-voice audio maneuver instruction within a relatively short distance prior to the upcoming maneuver, such as within one-tenth of one mile, the driver will identify the tone(s) with the immediacy of the upcoming maneuver as opposed to a repetitive and less urgent voice instruction.

In another embodiment of the present invention, the non-voice audible maneuver instruction can also be provided as a three-dimensional (3D) environment. The navigation system is connected to the vehicle sound system and a plurality of speakers. The navigation system CPU would initially begin projecting the instruction through a loudspeaker, which is in a location that does not coincide with the direction associated with the instruction. While projecting the instruction the CPU would also begin projecting the instruction through another loudspeaker that does correspond with the maneuver. The CPU would then complete projecting the first non-voice maneuver instruction entirely from the second loudspeaker. This movement of the instruction will create a "whooshing" effect that will enhance the ability of the driver to perceive the content of the first non-voice audible maneuver instruction.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
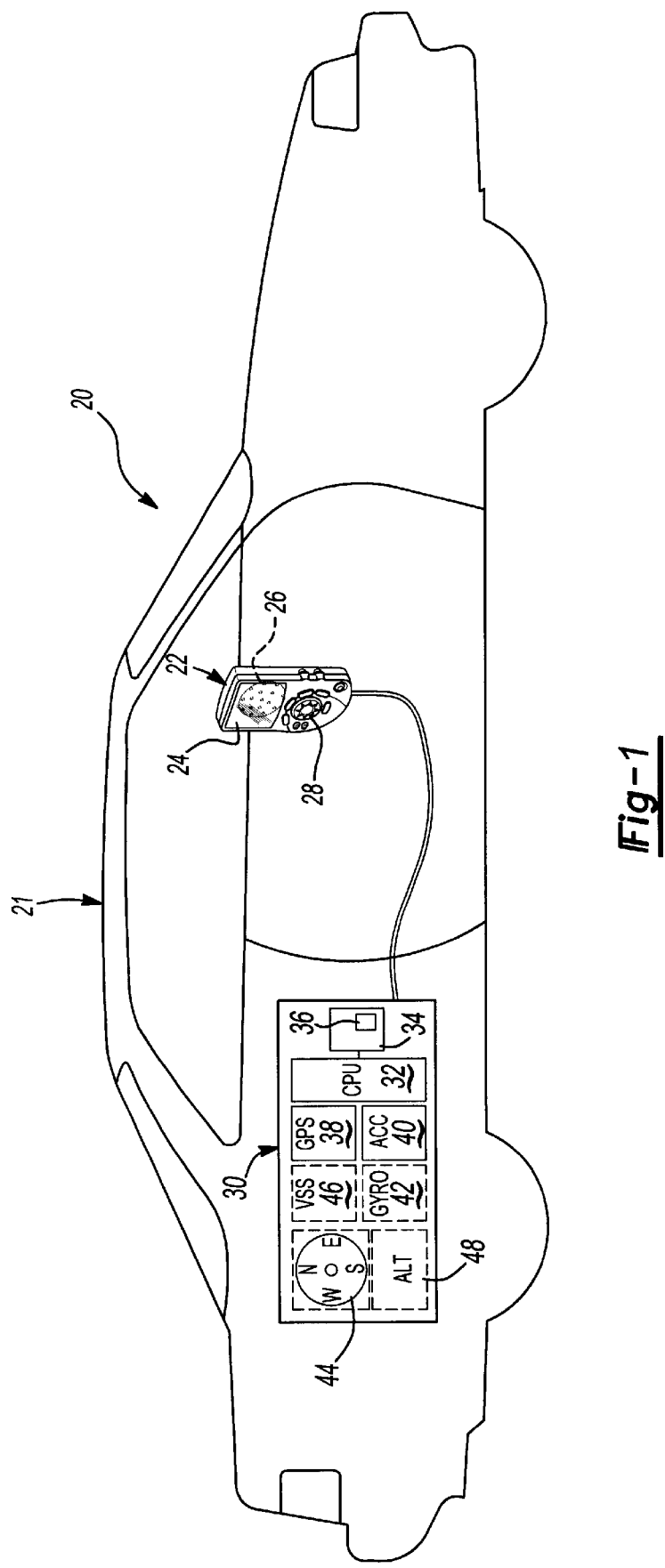
FIG. 1 is a schematic of a navigation system according to the present invention.

The navigation system 20 of the present invention is shown schematically in FIG. 1 installed in a vehicle 21. The navigation system 20 includes an Operator Interface Module ("OIM") 22 including input and output devices. The OIM 22 includes a display 24, such as a high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a computer module 30 connected to the OIM 22. The computer module 30 includes a CPU 32 and storage device 34 connected to the CPU 32. The storage device 34 may include a hard drive, CD ROM, DVD, RAM, ROM or other optically readable storage, magnetic storage or integrated circuit. The storage device 34 contains a database 36 including a map of all the roads in the area to be traveled by the vehicle 21 as well as the locations of potential destinations, such as addresses, hotels, restaurants, or previously stored locations. The software for the CPU 32, including the graphical user interface, route guidance, operating system, position-determining software, etc may also be stored in storage device 34 or alternatively in ROM, RAM or flash memory.

The computer module 30 preferably includes navigation sensors, such as a GPS receiver 38 and an inertial sensor, which is preferably a multi-axis accelerometer 40. The computer module 30 may alternatively or additionally include one or more gyros 42, a compass 44, a wheel speed sensor 46 and altimeter 48, all connected to the CPU 32. Such position and motion determining devices (as well as others) are well known and are commercially available.

The navigation system 20 propagates the position of the vehicle 21 relative to the map database 36, i.e. relative positions on road segments and intersections ("nodes"). The navigation system 20 also determines the current location of the vehicle 21 in terms of latitude and longitude. Utilizing any of a variety of known techniques, the position of the vehicle 21 relative to the map database 36 and/or in terms of latitude and longitude is determined at least in part based upon the motion signals from the multi-axis accelerometer 40. The current local time and date can be determined from the GPS signals received by the GPS receiver 38.

Generally, the CPU 32 and position and motion determining devices determine the position of the vehicle 21 relative to the database 36 of roads utilizing dead reckoning, map-matching, etc. Further, as is known in navigation systems, the user can select a destination relative to the database 36 of roads utilizing the input device 28 and the display 24. The navigation system 20 then calculates and displays a recommended route directing the driver of the vehicle 21 to the desired destination. Preferably, the navigation system 20 displays turn-by-turn instructions on display 24 and gives corresponding audible instructions on audio speaker 26, guiding the driver to the desired destination.

Figure 2:
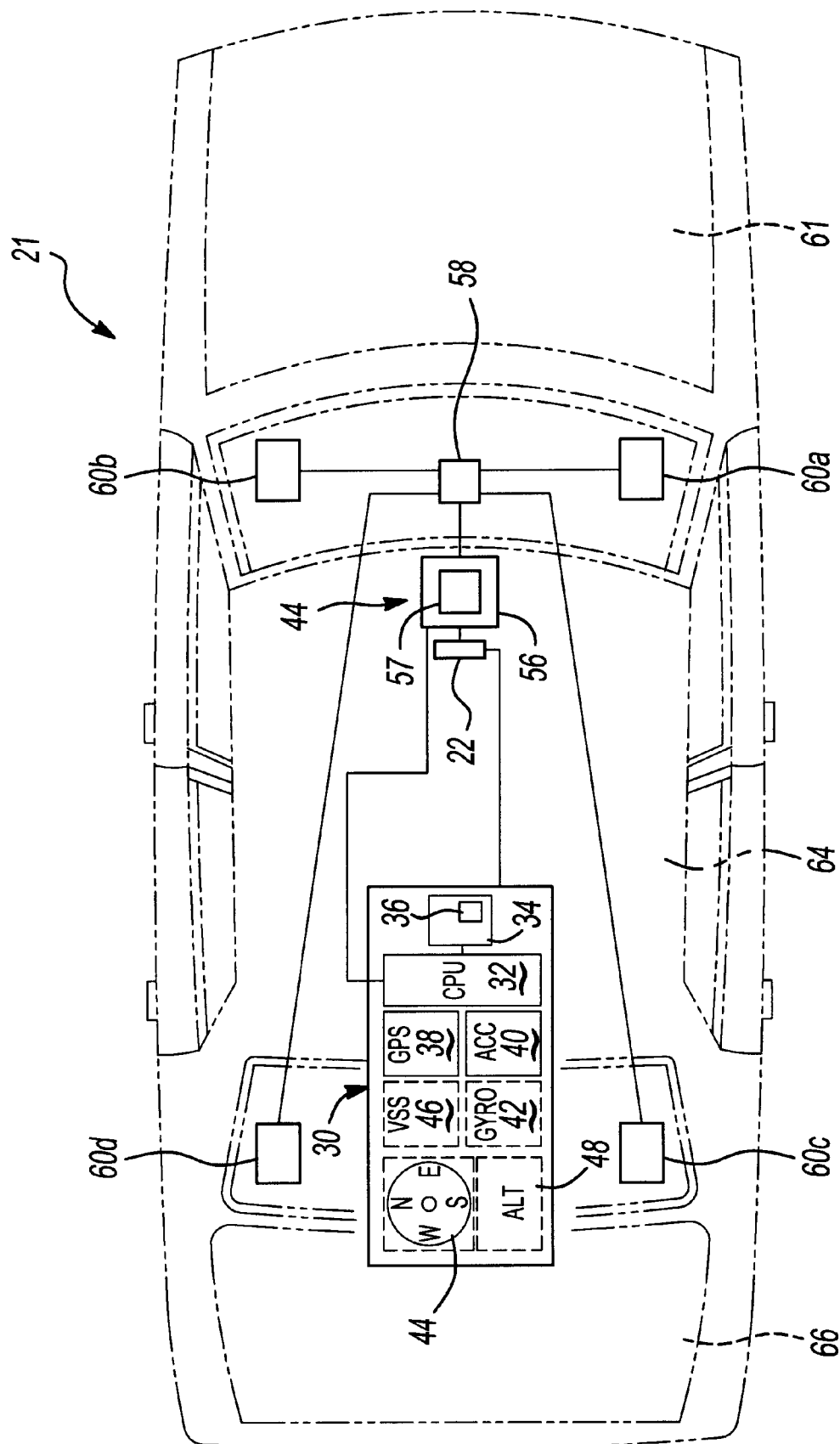
FIG. 2 is a schematic of a navigation system connected to a vehicle sound system and a plurality of loud speakers.

Referring to FIG. 2, the vehicle 21 is schematically shown from the top. The vehicle 21 includes an engine compartment 62, a passenger compartment 64, and a trunk 66. The vehicle also includes an audio system 44 having a plurality of loud speakers 60a–60d within the passenger compartment 64. Although the present invention preferably projects maneuver instructions through the audio speaker 26 of the OIM 22, the CPU 32 of the navigation system 20 can be additionally or alternatively connected to the vehicle sound system 44.

The vehicle sound system 44 can include a sound amplifier 56, a three-dimensional ("3D") sound generator 57 and a volume regulator 58. Preferably, the loud speakers 60a–60d are speakers commonly included in the audio system installed within the vehicle. The 3-D sound generator 57 is of a conventional type known in the art. The 3-D sound generator 57 creates the impression that the sound is coming from a specific location, which may not necessarily coincide with the location of any of the plurality of loud speakers 60a–60d. The spatial impression created by the 3-D sound generator 57 enables the sound system 44 to project an audible maneuver instruction from any point within a 360 degree radius of the driver and also from a location either above or below the driver.

Figure 3:
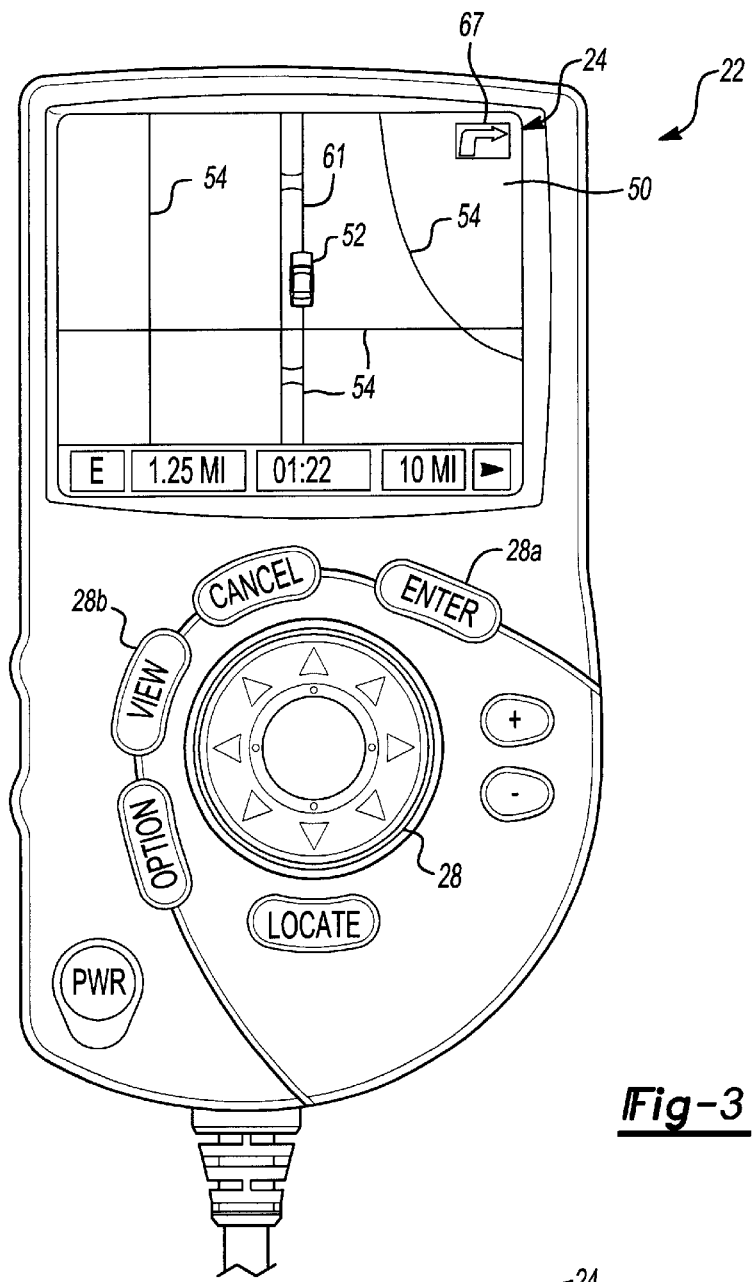
FIG. 3 is the OIM of the navigation system illustrated in FIG. 1 showing a map display.

FIG. 3 illustrates the OIM 22. As can be seen in FIG. 3, the input devices 28 include an "enter" key 28a. In FIG. 3, the display 24 is in a map display mode displaying a map screen 50, including a vehicle icon 52 representing the current position of the vehicle 21 on roads 54. The navigation system 20 is in a route guidance mode and displays a recommended route 61. Preferably, the upcoming maneuver is displayed as a "thumb-nail" 67 which generally displays a directional arrow having a shape that corresponds to the upcoming maneuver. The navigation system 20 displays the current position by displaying the vehicle icon 52 relative to the roads 54 on display 24. The map display screen 50 of FIG. 3 is normally displayed with the heading of the vehicle icon 52 directed upwards (or North up, based upon user preference), with the map of roads 54 moving and rotating based upon movement of the vehicle 21. However, the map display screen 50 can also display a movable vehicle icon 52 relative to a constant heading display 24 based upon user preference.

Figure 4:
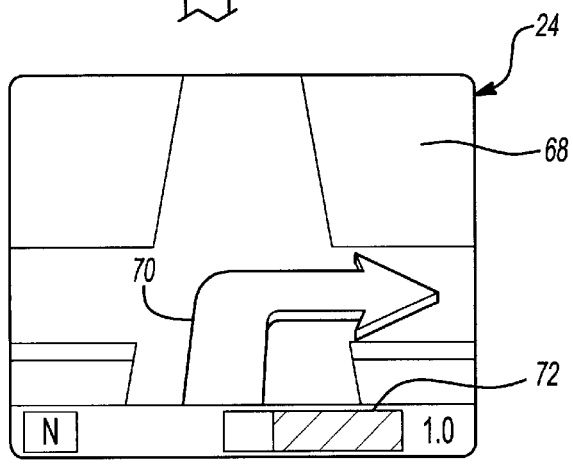
FIG. 4 is the display of FIG. 3 displaying a maneuver instruction.

Referring to FIG. 4, as vehicle 21 approaches an upcoming maneuver the display 24 switches from the map display screen 50 (FIG. 3) to a maneuver instruction screen 68. Maneuver instruction screen 68 includes the maneuver instruction 70, such as a right turn arrow, as shown. The maneuver instruction 70 indicates to the driver the next maneuver to be performed along the recommended route to the destination. The maneuver instruction screen 68 also displays a countdown display such as a bar graph 72 which indicates the imminence of the upcoming maneuver. The bar graph 72 preferably begins one-tenth of one mile prior to the upcoming maneuver and is depleted as the vehicle approaches the upcoming maneuver. The user is thereby provided with constant information on the distance to the upcoming maneuver. This is particularly advantageous in a highly congested or road intense environment such as a city.

By way of illustration, the method of the present invention and the use of the navigation system 20 in combination with the sound system 44 will be described as it would be used to instruct a driver to make a right turn. As will be understood by one of ordinary skill in the art, the method and system would be similarly utilized to provide other route guidance instructions to the driver.

First, a user selects a destination from the database of roads 28 with the input device 26. Then the route determination system 52 in the CPU 22 determines a recommended route 61 to the selected destination on the database of roads 28. The CPU 22 then displays at least a portion of the recommended route 61 on the display device 24 (FIG. 4). In addition, the CPU 22 selects a voiced maneuver instruction from the database of voiced maneuver instruction based on the first maneuver on the determined route. In this example, this voiced maneuver instruction might be the following: "Right turn ahead." This instruction is preferably given a plurality of times as the vehicle approaches the upcoming maneuver. Preferably, the voiced maneuver instruction is repeated at 2 miles, 1 mile, and 0.5 miles prior to the upcoming maneuver.

As the vehicle approaches to within a first predetermined distance of the upcoming maneuver, the CPU 22 switches from the map display screen 50 (FIG. 3) to a maneuver instruction screen 58 (FIG. 4). When approaching the upcoming maneuver, the maneuver instruction screen 68 generally displays a directional arrow having a shape that corresponds to the maneuver. When the vehicle is very near the execution of the upcoming maneuver, it is preferable to provide a non-voice audible maneuver instruction that is always consistent with the upcoming maneuver. It is further preferred that the nonvoice audible maneuver instruction have at least a first portion and a second portion. For example only: a right turn can be a low tone followed by a high tone; a left turn can be a high tone followed by a low tone; a straight ahead instruction can be a mid-level tone followed by another mid-level tone; and a U-turn can be a a high tone followed by a low tone followed by a high tone. The CPU 22 can also vary the spatial relationship of the first and second portion with respect to the upcoming maneuver. For example only: a right turn can have a long first portion followed by a short second portion; and a left turn can have a short first portion followed by a long second portion.

Although particular non-voice audio maneuver instructions are provided in this disclosed embodiment, it should be realized other audio maneuver instructions such as bells, chimes, whistles, musical notes, or a variety of user defined sounds can also be used as the non-voice audible maneuver instruction. The combinations can be preset or user defined. The only constant is that the same non-voice audible maneuver instruction is always provided for a particular upcoming maneuver.

After a short familiarization period the driver will intuitively identify the particular tone or series of tones with the particular maneuver. Further, by only providing the non-voice audio maneuver instruction within a relatively short distance prior to the upcoming maneuver, such as within one-tenth of one mile, the driver will identify the tone(s) with the immediacy of the upcoming maneuver as opposed to the repetitive and less urgent voice instruction.

The non-voice audible maneuver instruction can also be provided as a three-dimensional (3D) environment. The CPU 22 can project a left turn maneuver instruction from the left speaker(s) 60b, 60d and rights turn maneuver instruction form a right speaker 60a, 60c. Alternatively or additionally, the CPU 22 can move the non-voice audible maneuver instruction as disclosed in U.S. Pat. No. 6,172,641 that is incorporated herein by reference. The CPU 22 through the sound system 44 would initially begin projecting the instruction through loudspeaker 60d, which is in a location that does not coincide with the direction associated with the instruction. While projecting the instruction the CPU 22 would also begin projecting the instruction through loudspeaker 60a. The CPU 22 would then complete projecting the first non-voice maneuver instruction entirely from loudspeaker 60a.

Changing the location that the first audible maneuver instruction is projected from while projecting the first audible maneuver instruction will cause the driver to perceive the first audible maneuver instruction as moving from loudspeaker 60d to 60a during projection of the instruction. This movement of the instruction will create a "whooshing" effect that will enhance the ability of the driver to perceive the content of the first non-voice audible maneuver instruction. As will be understood by one of ordinary skill in the art, when the sound system 44 includes the 3-D sound generator 57, the whooshing effect that is created may include additional spatial characteristics that are perceived by the driver.

The foregoing description is exemplary rather than defined by the limitations within. Many modifications and variations of the present invention are possible in light of the above teachings. The preferred embodiments of this invention have been to disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

I claim:

1. A vehicle navigation system comprising:
   a database including a plurality of roads;
   a position determining system, said position determining system determining a position of a vehicle relative to said plurality of roads;
   an input device for selecting a destination from said database;
   a route determination system, said system determining a route to said destination via a plurality of maneuvers on said plurality of roads; and
   a sound system for projecting a non-voice audible maneuver instruction for each of the plurality of maneuvers.

2. A vehicle navigation system as recited in claim 1, wherein said non-voice audible maneuver instruction is projected just prior to each said maneuver.

3. A vehicle navigation system as recited in claim 1, wherein said non-voice audible maneuver instruction is projected within one-tenth of a mile of said maneuver.

4. A vehicle navigation system as recited in claim 1 wherein said non-voice audible maneuver instruction includes a first portion and a second portion having a predetermined spatial relationship.

5. A vehicle navigation system as recited in claim 1 wherein said non-voice audible maneuver instruction includes a first tone and a second tone.

6. A vehicle navigation system as recited in claim 5 wherein said first tone is projected before said second tone to indicate an upcoming first maneuver and said second tone is projected before said first tone to indicate an upcoming second maneuver.

7. A vehicle navigation system as recited in claim 6 wherein said first maneuver is a right turn and said second maneuver is a left turn.

8. A vehicle navigation system as recited in claim 6 wherein said first tone is of a different frequency than said second tone.

9. A vehicle navigation system as recited in claim 6, further comprising a third tone.

10. A vehicle navigation system as recited in claim 6 wherein an upcoming right turn maneuver is indicated by said first tone followed by said second tone, said second tone having a frequency different than said first tone.

11. A vehicle navigation system as recited in claim 6 wherein an upcoming left turn maneuver is indicated by said second tone followed by said first tone, said second tone having a frequency different than said first tone.

12. A vehicle navigation system as recited in claim 6 wherein an upcoming straight-ahead maneuver is indicated by said first tone followed by said second tone, said first tone having the same frequency as said second tone.

13. A vehicle navigation system as recited in claim 6 wherein an upcoming U-turn maneuver is indicated by said first tone followed by said second tone followed by said first tone, said first tone having a frequency different from said second tone.

14. A vehicle navigation system as recited in claim 1 further comprising a CPU controlling movement of said non-voice audible maneuver instruction from a first location to a second location within the vehicle.

15. A vehicle navigation system as recited in claim 5 wherein a spatial relationship of said first and said second tone are variable by said CPU with respect to each of said maneuvers.

16. A vehicle navigation system as recited in claim 1 wherein said sound system further includes a three dimensional sound generator, said sound system projecting said non-voice audible maneuver instruction from a first location and a second location and moving said audible maneuver instruction from said first location to said second location along a pathway that coincides with the directional content of said non-voice audible maneuver instruction during the output of said non-voice audible maneuver instruction.

17. A vehicle navigation system comprising:
   a database including a plurality of roads;
   an input device for selecting a destination from said database;
   a route determination system, said system determining a route to said destination via a plurality of maneuvers on said plurality of roads; and
   a sound system for projecting an audible maneuver instruction for each one of a plurality of maneuvers, said audible maneuver instruction projected within one-tenth of a mile of said upcoming maneuver and having a first portion and a second portion.

18. A vehicle navigation system as recited in claim 17 wherein a first tone is projected during said first portion and a second tone is projected during said second portion to indicate an upcoming right turn maneuver, and said second tone is projected during said first portion and said first tone is projected during said second portion to indicate an upcoming left turn maneuver.

19. A vehicle navigation system as recited in claim 17 wherein a third tone is projected during said first and said second portion to indicate an upcoming straight ahead maneuver.

20. A vehicle navigation system as recited in claim 17 further comprising a CPU controlling movement of said audible maneuver instruction from a first location to a second location within the vehicle.

21. A vehicle navigation system as recited in claim 17 wherein a spatial relationship of said first portion and said second portion are variable by said CPU with respect to said upcoming maneuver.

22. A method for guiding a user of a vehicle navigation system along a route, said method comprising the following steps:
   (a) determining a route on a plurality of roads to a destination via a plurality of maneuvers;
   (b) projecting a non-voice audible maneuver instruction for each of said plurality of maneuvers determine in said step (a), said non-voice audible maneuver instruction having a first portion and a second portion.

23. A method for guiding a user of a vehicle navigation system along a route as recited in claim 22, wherein said step (b) is performed within one tenth of one mile prior to an upcoming maneuver.

24. A method for guiding a user of a vehicle navigation system along a route as recited in claim 22 wherein each of said non-voice audible maneuver instruction is particular to a predetermined maneuver.

25. A method for guiding a user of a vehicle navigation system along a route as recited in claim 22 wherein an upcoming right turn maneuver is indicated by a first tone projected during said first portion followed by a second tone projected during said second portion, said second tone having a frequency different than said first tone.

26. A method for guiding a user of a vehicle navigation system along a route as recited in claim 22 wherein an upcoming left turn maneuver is indicated by a second tone projected during said first portion followed by a first tone projected during said second portion, said second tone having a frequency different than said first tone.

27. A method for guiding a user of a vehicle navigation system along a route as recited in claim 22 wherein an upcoming straight-ahead maneuver is indicated by a first tone projected during said first portion followed by a second tone projected during said second portion, said first tone having the same frequency as said second tone.

28. A method for guiding a user of a vehicle navigation system along a route as recited in claim 22 wherein an upcoming U-turn maneuver is indicated by a first tone projected during said first portion followed by a second tone projected during said second portion followed by said first tone projected during a third portion, said first tone having a frequency different as said second tone.

29. A method for guiding a user of a vehicle navigation system along a route as recited in claim 22 wherein said step (b) further includes the step of moving said nonvoice audible maneuver instruction from a first location to a second location corresponding to an upcoming maneuver.

* * * * *